US012407452B2

(12) United States Patent
Jacobsen et al.

(10) Patent No.: US 12,407,452 B2
(45) Date of Patent: Sep. 2, 2025

(54) FLEXIBLE SEMI-STATIC HARQ-ACK CODEBOOK OVERHEAD

(71) Applicant: NOKIA TECHNOLOGIES OY, Espoo (FI)

(72) Inventors: Thomas Haaning Jacobsen, Nørresundby (DK); Klaus Hugl, Vienna (AT); Guillermo Pocovi, Aalborg (DK); Sigen Ye, Whitehouse Station, NJ (US)

(73) Assignee: Nokia Technologies Oy, Espoo (FI)

( * ) Notice: Subject to any disclaimer, the term of this patent is extended or adjusted under 35 U.S.C. 154(b) by 550 days.

(21) Appl. No.: 17/905,743

(22) PCT Filed: Feb. 15, 2021

(86) PCT No.: PCT/EP2021/053600
§ 371 (c)(1),
(2) Date: Sep. 6, 2022

(87) PCT Pub. No.: WO2021/180422
PCT Pub. Date: Sep. 16, 2021

(65) Prior Publication Data
US 2023/0179339 A1    Jun. 8, 2023

Related U.S. Application Data

(63) Continuation of application No. 16/816,038, filed on Mar. 11, 2020, now abandoned.

(51) Int. Cl.
*H04L 1/1812*    (2023.01)
*H04B 7/0456*    (2017.01)
(Continued)

(52) U.S. Cl.
CPC ......... *H04L 1/1819* (2013.01); *H04B 7/0456* (2013.01); *H04L 1/1614* (2013.01);
(Continued)

(58) Field of Classification Search
None
See application file for complete search history.

(56) References Cited

U.S. PATENT DOCUMENTS

2018/0242286 A1    8/2018  Song et al.
2019/0268803 A1    8/2019  He et al.
(Continued)

FOREIGN PATENT DOCUMENTS

WO    2019160483 A1    8/2019

OTHER PUBLICATIONS

International Search Report and Written Opinion for International Application No. PCT/EP2021/053600, mailed May 25, 2021; 11 pages.
(Continued)

*Primary Examiner* — Phirin Sam
(74) *Attorney, Agent, or Firm* — Barta Jones, PLLC

(57) ABSTRACT

A method, apparatus, and a computer-readable storage medium are provided for constructing a HARQ-ACK codebook for managing the trade-off between codebook size and feedback granularity. In an example implementation, the method may include a network node determining a second time domain resource allocation table and transmitting configuration information to the UE. The method may further include the network node transmitting downlink data to the UE and receiving the one or more ACKs and/or NACKs from the UE in response to the transmitting of the downlink data, the one or more ACKs/NACKs being generated based at least on the second time resource allocation table. In another example implementation, the method may include a user equipment (UE) receiving configuration information from a network node, receiving downlink data from the network node, and transmitting one or more ACKs/NACKs to the network node.

11 Claims, 6 Drawing Sheets

(51) Int. Cl.
    *H04L 1/1607*    (2023.01)
    *H04L 5/00*       (2006.01)
    *H04W 72/0446*   (2023.01)
    *H04W 72/23*     (2023.01)

(52) U.S. Cl.
    CPC ....... *H04L 5/0055* (2013.01); *H04W 72/0446* (2013.01); *H04W 72/23* (2023.01)

(56) References Cited

U.S. PATENT DOCUMENTS

| | | |
|---|---|---|
| 2019/0312713 A1 | 10/2019 | Yang et al. |
| 2020/0337029 A1* | 10/2020 | Yi .................. H04W 72/23 |
| 2020/0358562 A1* | 11/2020 | Peng ............. H04W 72/0446 |

OTHER PUBLICATIONS

3GPP TSG RAN WGl #100, R1-2000936; "Remaining Issues on UCI Enhancement for NR URLLC"; Source: Wilus Inc.; Agenda item: 7.2.5.2; e-Meeting; Feb. 24-Mar. 6, 2020; 8 pages.

3GPP TSG-RAN WGl #99, R1-1912960; "UCI Enhancements for eURLLC"; Reno, Nevada, USA; Source: Qualcomm Incorporated; Agenda item: 7.2.6.2; Nov. 18-22, 2019; 12 pages.

"3rd Generation Partnership Project; Technical Specification Group Radio Access Network; NR; Physical layer procedures for data (Release 15)", 3GPP TS 38.214, V15.8.0, Dec. 2019, pp. 1-106.

* cited by examiner

300

| A | | B | | C | D |
|---|---|---|---|---|---|
| E | | | | F | |

310

| Row Index | DMRS-Type A-Position | PDSCH Mapping Type | K0 | S | L |
|---|---|---|---|---|---|
| 1 | 2 | A | 0 | 0 | 4 |
| 2 | 3 | B | 0 | 4 | 4 |
| 3 | 2 | B | 0 | 8 | 3 |
| 4 | 2 | B | 0 | 11 | 3 |
| 5 | 2 | A | 0 | 0 | 9 |
| 6 | 3 | B | 0 | 9 | 5 |

330

| 1 | 2 | 3 | 4 |
|---|---|---|---|
| 1 | | 3 | |

340

| Row Index | S | L |
|---|---|---|
| 1 | 0 | 9 |
| 2 | 9 | 5 |

350

| 1 | 1 | 2 | 2 |
|---|---|---|---|
| 1 | | 2 | |

FIG. 3

FLEXIBLE SEMI-STATIC HARQ-ACK CODEBOOK OVERHEAD

CROSS-REFERENCE TO RELATED APPLICATIONS

This application is a national stage entry of International Application No. PCT/EP2021/053600, filed Feb. 15, 2021, entitled "FLEXIBLE SEMI-STATIC HARQ-ACK CODEBOOK OVERHEAD" which claims the benefit of priority of U.S. application Ser. No. 16/816,038, filed Mar. 11, 2020, both of which are hereby incorporated by reference in their entireties.

TECHNICAL FIELD

This description relates to wireless communications, and in particular, construction of codebooks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for constructing a HARQ-ACK codebook for managing the trade-off between codebook size and feedback granularity.

In an example implementation, the method may include determining, by a network node, a second time domain resource allocation table, the second time domain resource allocation table being different from a first time domain resource allocation table, the first time domain resource allocation table used for indicating time domain resources allocated to a physical downlink shared channel for communications with a user equipment (UE) and the second time domain resource allocation table used for generating one or more hybrid automatic repeat request (HARQ) acknowledgements (ACKs) and/or negative ACKs (NACKs) by the UE and transmitting, by the network node, configuration information to the UE, the configuration information indicating to the UE to use the second time domain resource allocation table for generating the one or more HARQ ACKs and/or NACKs. The method may further include transmitting, by the network node, downlink data to the UE; and receiving, by the network node, the one or more ACKs and/or NACKs from the UE in response to the transmitting of the downlink data, the one or more ACKs/NACKs being generated based at least on the second time resource allocation table.

In another example implementation, the method may include receiving, by a user equipment (UE), configuration information from a network node, the configuration information indicating to the UE to use a second time domain resource allocation table for generating one or more hybrid automatic repeat request (HARQ) acknowledgements (ACKs) and/or negative ACKs (NACKs); receiving, by the UE, downlink data from the network node; and transmitting, by the UE, the one or more ACKs/NACKs to the network node in response to the receiving of the downlink data, the one or more ACKs/NACKs configured based at least on the second time resource allocation table.

In another example implementation, the apparatus may include at least one processor; and at least one memory including computer program code; the at least one memory and the computer program code configured to, with the at least one processor, cause the apparatus at least to perform determining a second time domain resource allocation table, the second time domain resource allocation table being different from a first time domain resource allocation table, the first time domain resource allocation table used for indicating time domain resources allocated to a physical downlink shared channel for communications with a user equipment (UE) and the second time domain resource allocation table used for generating one or more hybrid automatic repeat request (HARQ) acknowledgements (ACKs) and/or negative ACKs (NACKs) by the UE and transmitting configuration information to the UE, the configuration information indicating to the UE to use the second time domain resource allocation table for generating the one or more HARQ ACKs and/or NACKs. The method may further include transmitting downlink data to the UE; and receiving the one or more ACKs and/or NACKs from the UE in response to the transmitting of the downlink data, the one or more ACKs/NACKs being generated based at least on the second time resource allocation table.

In another example implementation, the apparatus may include at least one processor; and at least one memory including computer program code; the at least one memory and the computer program code configured to, with the at least one processor, cause the apparatus at least to perform receiving configuration information from a network node, the configuration information indicating to the UE to use a second time domain resource allocation table for generating one or more hybrid automatic repeat request (HARQ) acknowledgements (ACKs) and/or negative ACKs (NACKs); receiving downlink data from the network node; and transmitting the one or more ACKs/NACKs to the network node in response to the receiving of the downlink data, the one or more ACKs/NACKs configured based at least on the second time resource allocation table.

BRIEF DESCRIPTION OF THE DRAWINGS

FIG. 3 illustrates construction of an example F-TDRA table, according to an example implementation.

DETAILED DESCRIPTION

Figure 1:
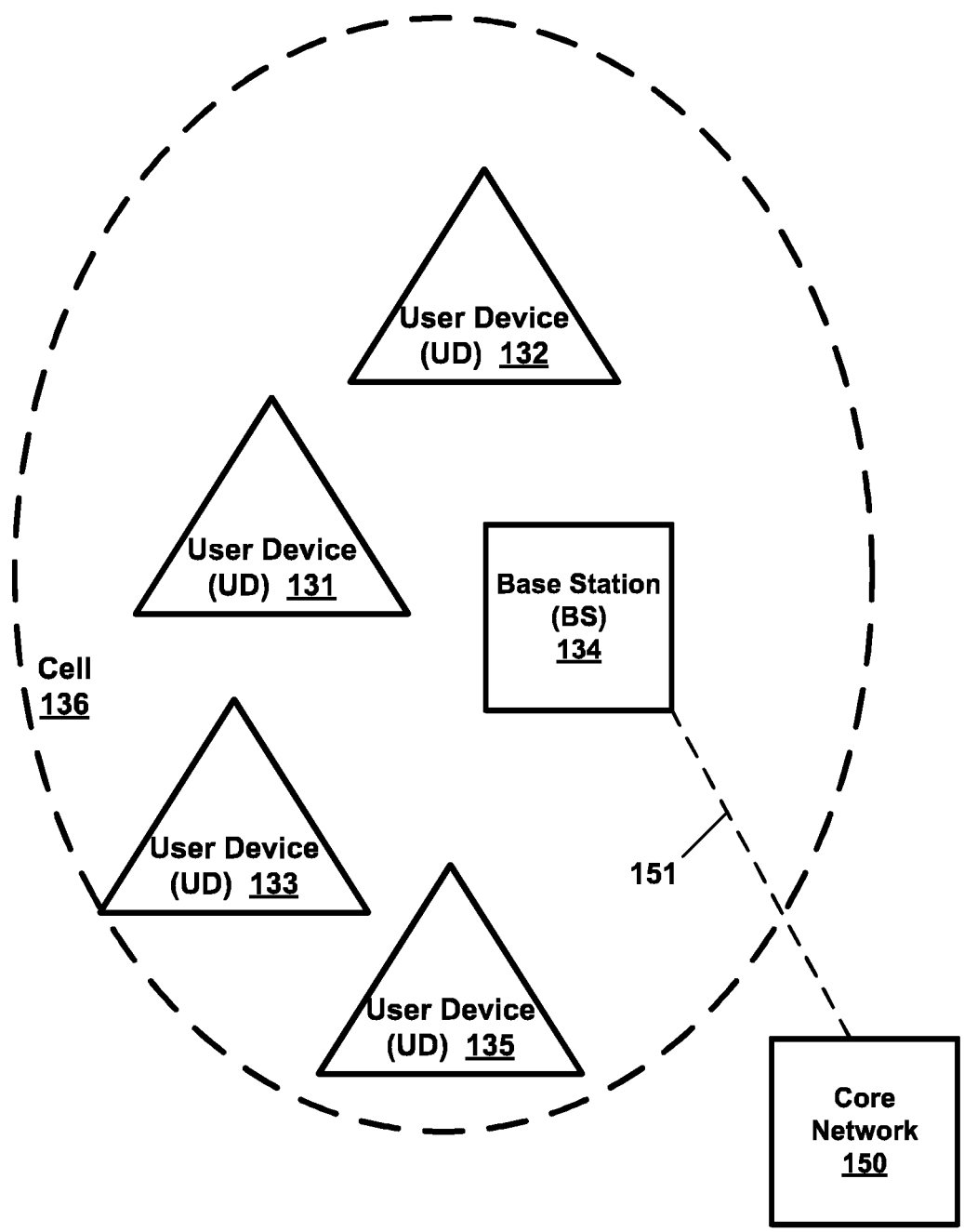
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a Si interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1 e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (TRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

For each downlink transmission from a gNB on a physical downlink shared channel (PDSCH), a UE may send hybrid automatic repeat request-acknowledgement (HARQ-ACK) feedback indicating a transport block in the PDSCH has been correctly (ACK) or incorrectly decoded (NACK) by the UE. The feedback may be transmitted on a physical uplink control channel (PUCCH) or multiplexed with data on a physical uplink shared channel (PUSCH). The gNB may retransmit the transport block upon the reception of a NACK from the UE. The UE may indicate HARQ-ACK feedback bits from one or multiple DL data transmissions. Thus, HARQ-ACK feedback may be conveyed to the gNB based on a HARQ-ACK codebook, which may include one or more HARQ-ACK bits sorted based on a pre-defined procedure (e.g., a configurable standardized procedure).

The size of Type-I hybrid automatic repeat request-acknowledgement (HARQ-ACK) codebook may be determined by HARQ-ACK feedback window which may be determined by, for example, at least a value of K1, which may provide timing from PDSCH allocation to HARQ-ACK feedback. In an example implementation, K1 may be provided through a radio resource control (RRC) parameter, e.g., dl-DataToUL-ACK. In some implementations, for example, in R16, the UE may be configured with a plurality of dl-DataToUL-ACK parameters, one for DCI format 1_1/1_0, one for DCI format 1_2 and a default set for DCI format 1_0), content of one or multiple physical downlink shared channel (PDSCH) time domain resource allocation (TDRA) tables, and/or the number of active serving cells for the UE. When flexibility in PDSCH allocations is desired, e.g., allocations of 1-4 symbol lengths with different starting symbol indexes, the size of the Type-1 HARQ-ACK codebook increases, even though not all TDRA entries are simultaneously utilized. This increase in the size of the Type-1 hybrid HARQ-ACK codebook may result in excessive signalling overhead and/or less reliable PUCCH transmissions.

For example, short PDSCH allocations may be needed for ultra-reliable low latency communications (URLLC) or semi-persistent scheduling (SPS) in the context of time sensitive communications (TSC), where a higher time-domain resolution of allocation opportunities is needed. But the traffic may not arrive so frequently to require all these allocations to be used in a downlink slot/sub-slot. As a result, in a particular radio slot, not all rows of a TDRA table are used simultaneously.

The above described properties of Type-1 HARQ-ACK allow for the size of the HARQ-ACK codebook to be determined for any slot/sub-slot independent of actual received PDSCH allocations. In other words, for example, the UE and the gNB may determine the number of HARQ-ACK bits in the physical uplink control channel (PUCCH) resources in advance. These properties may allow the gNB to understand how the codebook is constructed without ambiguity even if the UE has missed one or more downlink assignments, which may not be the case with a Type-2 (dynamic) codebook. In a dynamic codebook, for example, HARQ-ACK bits may be determined based on what has been scheduled to the UE as the UE may miss one or more downlink assignments which may cause codebook size ambiguity. In a static codebook, the size of the codebook may be pre-determined based on higher-layer configuration which makes it robust even if some PDSCH allocations are missed Therefore, Type-1 codebook is a desirable feature for URLLC.

The Type-1 HARQ-ACK codebook (or the algorithm used for generating or constructing the HARQ-ACK codebook) may be generally described in the following way based on, for example, the description in 3GPP TS 38.213 specification with some extensions to support R16 sub-slot based HARQ-ACK feedback. In an example implementation, the concept of sub-slots being introduced in R16, the HARQ-ACK codebook may be constructed based on smaller time durations (e.g., chunks). For example, an allocation in a downlink PDSCH slot may point to a corresponding uplink PUCCH slot from which the HARQ-ACK codebook is to be reported. This pointing may be performed by a K1 value (e.g., in dl-DataToUL ACK). In some implementations, for example, for cross numerology, multiple downlink slots may be overlapping a single uplink slot which may indicate that the codebook in this uplink slot is constructed for both corresponding downlink slots. In an example implementation of uplink PUCCH slots structured into sub-slots, 7 sub-slots of 2 symbol width or 2 sub-slots with 7 symbol widths as per R16 may be available. In some implementations, for example, the same logic may apply and downlink PDSCH allocations may point to a sub-slot and the unit of K1 may change to sub-slots. In other words, an uplink PUCCH sub-slot may only overlap a part of a downlink slot and the TDRA may be split into multiple TDRA tables, corresponding to each uplink PUCCH slot.

In an example implementation, at a first step (Step 1), a UE may be configured with a TDRA table for PDSCH which may be used in downlink assignments to indicate the time domain resources allocated to the assigned/scheduled PDSCH by pointing to an entry in the TDRA table. The TDRA table may represent most (if not all) possible PDSCH time domain allocation options for this UE. In some implementations, for example, the TDRA table may be implemented based on PDSCH-TimeDomainResourceAllocation-List as defined in 3GPP radio resource control (RRC) protocol specification TS 38.331.

The number of slots or sub-slots (sub-slot option enabled in R16), after the PDSCH allocation (which may be determined by the starting or ending symbol of the allocation in some implementations), to the slot/sub-slot where the HARQ-ACK bit of this allocation is to be transmitted has to be clearly defined. This may be dynamically indicated by a K1 index in the downlink assignment which may be an index in a vector dl-DataToUL-ACK. The unit of K1 may be in sub-slots when a sub-slot PUCCH is used and the unit of K1 may be in slots for R15 operation. The network (e.g., gNB) may send a vector (e.g., via RRC) to the UE as described, for example, in the 3GPP RRC protocol specification, TS 38.331. In some implementations, time-division duplex (TDD) patterns may also be used, and in R15, may be defined by TDD-UL-DL-ConfigurationCommon and TDD-UL-DL-ConfigDedicated, and may configure the UE via RRC by the network as described in the RRC protocol specification TS 38.331.

In some implementations, for example, a ratio of $2^{(\mu_{DL}-\mu_{UL})}$ between downlink sub-carrier spacing (SCS) configuration $\mu_{DL}$ and uplink SCS configuration $\mu_{UL}$ may be used when operating with mixed numerology for uplink and downlink and DL of a serving cell. This may be used to identify downlink slots (or sub-slots) spanned by uplink slots (or sub-slots).

In addition, in the example implementation described above, at a second step (Step 2), from a slot/sub-slot in which an HARQ-ACK bit is indicated to be carried, the HARQ-ACK feedback window may be determined. This is to provide HARQ-ACK feedback for all possible PDSCH allocations which could have pointed to this slot/sub-slot carrying the HARQ-ACK codebook on PUCCH. Therefore, the window may include all uplink slots/sub-slots possible by K1 values (for example, derived from dl-DataToUL-ACK) which could have pointed to this slot/sub-slot. For example, for each slot/sub-slot, in the HARQ-ACK feedback window, HARQ-ACK bits may be aggregated into a single HARQ-ACK codebook covering the slot/sub-slots in the feedback window.

In some implementations, for example, in R16, if a PUCCH sub-slot spans a time-frame that is smaller than the downlink slot, the PDSCH TDRA table may be split (or divided) into sub-tables based on, for example, PDSCH allocations which starts or ends within the slot/sub-slot duration, described further in detail in R1-1906752 or R1-1900970.

In some implementations, for example, the mapping between TDRA entries in the TDRA table to HARQ-ACK bits are determined by a procedure known as pruning. The pruning may be performed because PDSCH allocations in the TDRA table might be overlapping, for example, due to different start symbols and different lengths and need to be covered by a 1-dimensional vector, e.g., a HARQ-ACK codebook. The pruning algorithm from R15 (which may be reused for R16 just for sub-slot instead of slot based PUCCH operation) may be generally described as below.

In an example implementation, the following may be performed: removing TDRA entries corresponding to infeasible PDSCH allocations (e.g., with overlap uplink symbols); selecting a TDRA entry with a PDSCH allocation with an ending symbol in the smallest OFDM symbol index within the downlink slot (and marked with HARQ-ACK codebook bit index, for example, i (which initially may be equal to 0); and marking all TDRA entries with PDSCH allocations starting within the OFDM symbols spanned by the selected TDRA entry and mapping the marked TDRA entries by incrementing HARQ-ACK codebook bit index, for example, to i+1. In addition, if multiple entries are indicated by the same codebook bit index, the value of the codebook bit may be determined based on the following: incrementing HARQ-ACK codebook bit index, and iterating the selecting, marking, and incrementing (if needed) until all TDRA entries are marked with a HARQ-ACK codebook bit index for this slot/sub-slot. In other words, the TDRA table may apply to all DL slots, but one slot may also contain uplink symbols, and another may not contain uplink symbols. As such, entries in the TDRA table which may overlap an uplink symbol is not considered for the HARQ-ACK codebook construction algorithm.

For example, if multiple entries are indicated by the same codebook bit index the value of the codebook bit may be determined in several ways as described below. Then the HARQ-ACK codebook bit index may be incremented, for example, to i+1, and performing the iterating as described above until all entries are marked with a HARQ-ACK codebook bit index for this slot/sub-slot. If the UE indicates that it can receive multiple PDSCHs per slot and harq-ACK-SpatialBundlingPUCCH is configured, bundling is performed with a "binary AND operation of the HARQ-ACK information bits corresponding to first and second transport blocks of this cell—if the UE receives one transport block, the UE assumes ACK for the second transport block." Otherwise, if the UE indicates that it can receive multiple PDSCHs per slot and harq-ACK-SpatialBundlingPUCCH is NOT configured, the UE uses multiple HARQ-ACK bits and the bit index is incremented, for example, to i+1. Otherwise, if the UE does not indicate that it can receive multiple PDSCHs per slot, it selects the value based on the feedback result from the PDSCH allocation indicated by the detected DCI.

In some implementations, if the UE indicates that the UE can receive multiple PDSCHs per slot and harq-ACK-SpatialBundlingPUCCH is configured, bundling may be performed with a binary AND operation of the HARQ-ACK information bits corresponding to first and second transport blocks of this cell. Otherwise, If the UE indicates that it can receive multiple PDSCH per slot and harq-ACK-SpatialBundlingPUCCH is NOT configured, the UE may use multiple HARQ-ACK bits and the bit index may be increased to i+1. Further, if the UE does not indicate that it can receive multiple PDSCH per slot, it selects the value based on the feedback result from the PDSCH allocation indicated by the detected DCI.

Therefore, based on the above, Type-1 HARQ-ACK codebook size can be predetermined for any indicated slot/sub-slot as long the involved parameters are not changed. In addition, in some implementations, at least two codebooks may be simultaneously constructed. The codebook procedure is associated with a priority which can be indicated by the physical (PHY) layer. For example, for each priority, separate sub-slot configuration and PUCCH resource sets may be defined and/or separate PDSCH TDRA tables may be used as well. That is, in some implementations, for example, separate F-TDRA tables may be configured for each associated priority, or a single F-TDRA table may be used for both priorities, and mechanisms described in the present Specification may be applied for both priorities separately.

In an example implementation, a method for constructing a codebook by managing the trade-off between codebook size and feedback granularity is disclosed. In another example implementation, constructing a Type-1 HARQ-ACK codebook capable of managing the codebook size without compromising the allocation precision is disclosed as well. The method may include a network node (e.g., a gNB) may determine a feedback-time domain resource allocation (F-TDRA) table from at least one TDRA table. The TDRA may be used for indicating time domain resources allocated to a physical downlink shared channel (PDSCH) for communications with a user equipment (UE) and the F-TDRA table may be used for generating one or more hybrid automatic repeat request (HARQ) acknowledgements (ACKs) and/or negative ACKs (NACKs) by the UE. Further, the network node may transmit configuration information to the UE. The configuration information may indicate to the UE to use the F-TDRA table for generating the one or more HARQ ACKs and/or NACKs. Furthermore, the network node may transmit downlink data to the UE and receive the one or more ACKs and/or NACKs from the UE in response to the transmitting of the downlink data, the one or more ACKs/NACKs being generated based at least on the second time resource allocation table.

In another example implementation, another method for constructing a similar codebook is disclosed. The method may include a user equipment (UE) receive configuration information from a network node, the configuration information indicating to the UE to use a second time domain resource allocation table for generating one or more hybrid automatic repeat request (HARQ) acknowledgements (ACKs) and/or negative ACKs (NACKs). The method may further include the UE receiving downlink data from the network node and transmitting the one or more ACKs/NACKs to the network node in response to the receiving of the downlink data, the one or more ACKs/NACKs configured based at least on the second time resource allocation table.

Figure 2:
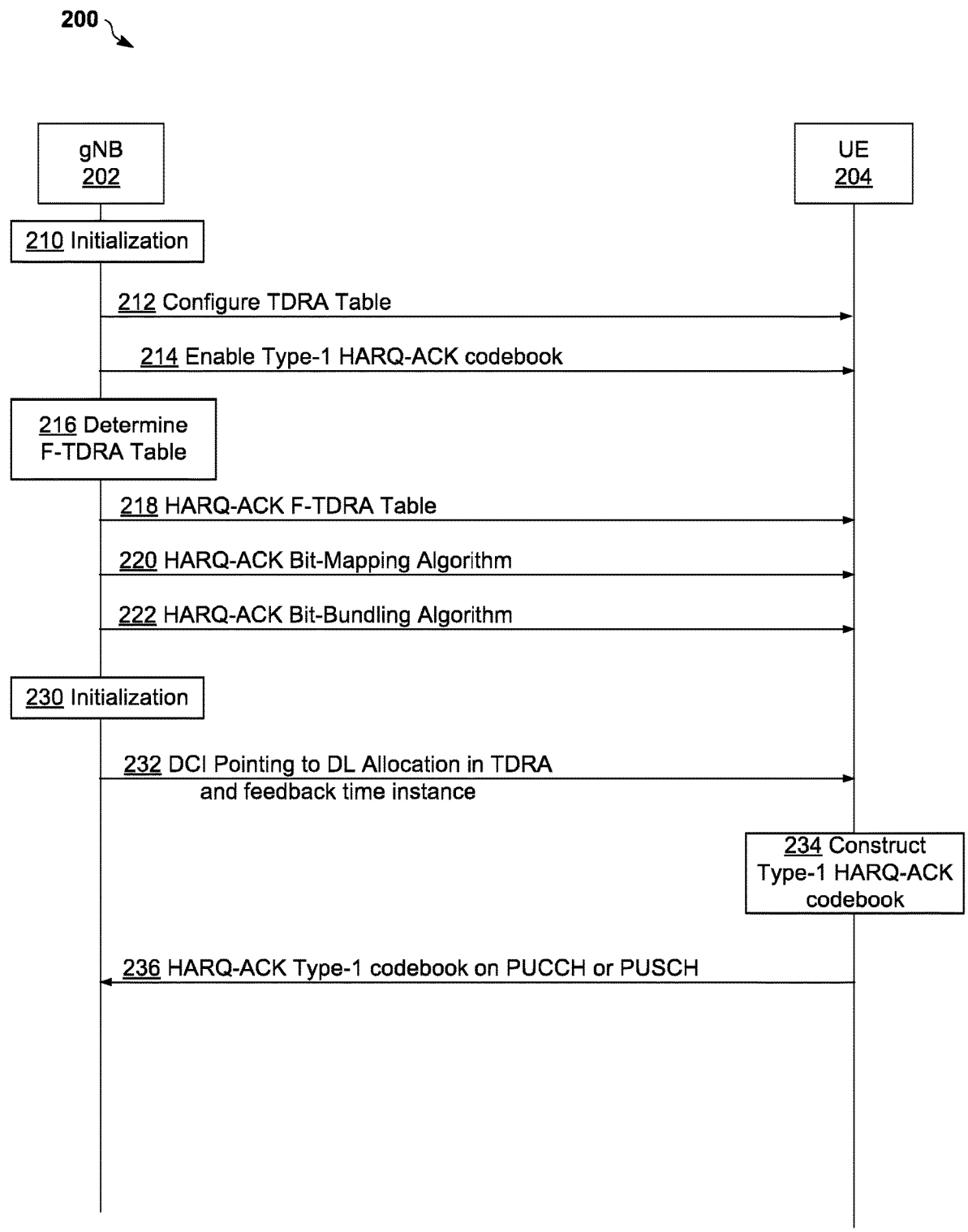
FIG. 2 is a flow diagram illustrating an example HARQ-ACK codebook for managing the trade-off between codebook size and feedback granularity, according to an example implementation.

FIG. 2 is a flow diagram 200 illustrating construction of an example HARQ-ACK codebook for managing the trade-off between codebook size and feedback granularity, according to an example implementation.

In an example implementation, during an initialization phase at 210 (which may be similar to step 1 described above), a gNB (e.g., gNB 202) at 212 may configure a UE (e.g., UE 204) with a time domain resource allocation table. In some implementations, for example, the configuration may be performed via RRC.

At 214, the gNB may send a message (e.g., an RRC message) to the UE to configure the UE to use Type-1 HARQ ACK codebook for HARQ-ACK feedback.

At 216, the gNB may determine (e.g., generate, construct, etc.) a HARQ-ACK feedback TDRA (F-TDRA) table. In an example implementation, the entries in the F-TDRA table may resemble a bit index in the HARQ-ACK codebook. The determining of the F-TDRA table may be implementation specific and one example implementation is described in detail with reference to FIG. 3. It should be noted that the configuration of the F-TDRA table is such that the resulting Type-1 HARQ-ACK codebook provides useful information about the simultaneous use of TDRA entries (e.g., usage correlation) and the choice of a bit-mapping algorithm.

At 218, the gNB may send the F-TDRA table to the UE.

At 220, the gNB may send a bit-mapping algorithm to UE 204. In some implementations, for example, the bit-mapping algorithm may be used by the UE to map the entries in the TDRA table into entries in the F-TDRA table.

At 222, the gNB may send a bit-bundling algorithm to the UE. In some implementations, for example, the bit-bundling algorithm may be used when multiple entries are indicated by the same codebook bit index. In an example implementation, bit-bundling algorithm may be applied on a per F-TDRA entry basis.

Further, in some implementations, for example, during an operation phase at 230 (which may be similar to step 2 described above), the gNB, at 232 may send downlink control information (DCI) pointing to downlink allocation in TDRA and feedback time instance. In some implementations, for example, the UE may be configured with SPS (no need to have a DCI) to trigger HARQ-ACK codebook reporting. For example, for SPS, both K1 and TDRA entry may be provided. The Type-1 HARQ-ACK codebook algorithm may be different for SPS in R16, but the same procedure described with F-TDRA may be used as well.

At 234, UE 204 may construct Type-1 HARQ-ACK codebooks. In some implementations, for example, the Type-1 HARQ-ACK codebook may be constructed (or generated) by the UE based on one or more of configuration information, bit mapping algorithm, and bit-bundling algorithm that are received from the gNB. In addition, the gNB may construct a similar Type-1 HARQ-ACK codebook.

At 236, the UE may send HARQ-ACK feedback to the gNB. In some implementations, for example, the UE may send HARQ-ACK feedback to the gNB based on the TDRA, F-TDRA, mapping algorithm (e.g., information), and/or bundling algorithm (e.g., information) received from the gNB.

Thus, the UE sends ACKs/NACKs to the gNB on a HARQ-ACK codebook that manages the trade-off between codebook size and feedback granularity.

FIG. 3 illustrates construction of example TDRA and F-TDRA tables for managing the trade-off between codebook size and feedback granularity, according to an example implementation.

In an example implementation, a gNB, e.g., gNB 202 may configure time domain resources for a UE, e.g., UE 204. The resources configured by the gNB may include six resources, e.g., A, B, C, D, E, and F as shown by 300 of FIG. 3. In some implementations, the resources illustrated in 300 of FIG. 3 may be defined in detail in a TDRA table as illustrated in 310 of FIG. 3. For example, row index values of 1, 2, 3, 4, 5, and 6 may be associated with resources A, B, C, D, E, and F respectively. The example resources illustrated in 310 of FIG. 3 may be similar to Table 5.1.2.1.1-2 of 3GPP TS 38.214 V15.8.0 (2019 December).

In some implementations, the gNB may configure the time domain resources via an RRC message. In an example implementation, the RRC message may contain entries to represent possible allocations the gNB may need to schedule PDSCHs and stored in a PDSCH-TimeDomainResourceAllocationList information element (IE).

In some implementations, for example, resources with short allocations (and with different offsets), for example, resources A, B, C, or D may be used for low latency URLLC traffic, TSC traffic, or smaller packet sizes such as TCP- ACK/NACKs. In some implementations, for example, resources with longer allocations, for example, resources E and F, which may span a downlink slot (e.g., 14 symbols), may be used for larger payloads.

In an example implementation, due to the pruning introduced in R15, 4 bits may be needed to represent possible allocations in a single slot, as illustrated by 330 of FIG. 3, where the HARQ-ACK row index "i" of each of the TDRA table entries may be indicated. In other words, 4-bits may be needed to represent all possible allocations in a single slot and Type-1 codebook may contain multiples of 4 bits to cover multiple slots and serving cells.

In some implementations, for example, the gNB may be aware of the traffic characteristics and may determine that resources A and B are not simultaneously used in the same slot, for example, as only a single data packet may be transmitted in the same downlink slot or based on time sensitive communications (TSC) traffic/TSC assistance information (TSCAI), etc. In a similar manner, the gNB may be aware of the traffic characteristics (e.g., periodicity) and may determine that resources C and D are not simultaneously used in the same slot. In some implementations, for example, based on the traffic characteristics described above, the gNB may generate an F-TDRA table as illustrated in 340 of FIG. 3. In an example implementation, the HARQ-ACK codebook based on the provided F-TDRA table may need 2 bits (instead of 4 bits) as illustrated in 350 of FIG. 3.

Therefore, as illustrated in FIG. 3, based on 340 and 350, in an example implementation, HARQ-ACK bit number 1 may indicate HARQ ACK/NACK feedback for TDRA entries A, B, or E, and HARQ-ACK bit number 2 may indicates ACK/NACK for TDRA entries C, D, or F.

In some implementations, for example, TDRA entries may be mapped into non-overlapping F-TDRA entries. In an example implementation, this may allow for the reuse of the pruning algorithm used on TDRA table in R15/R16 Type-1 HARQ-ACK codebook construction, where the F-TDRA table entries are used as references to map TDRA to bit indices, instead of entries from the TDRA table. This is further described in the TDRA entry selection of step 2, but would be changed to select the entry from the F-TDRA table which has the "ending symbol in the smallest OFDM symbol index within the DL slot," and then map all TDRA entries which starts (or ends) within the allocated symbol indices. The F-TDRA table does not have to cover all symbol indices covered by the TDRA table.

In some implementations, for example, TDRA entries may be mapped directly into F-TDRA entries, which may be overlapping. The mapping may be performed based on starting (or ending) symbol of the TDRA entry, where a TDRA entry may be mapped into multiple F-TDRA entries. In an example implementation, the gNB may use this approach for redundancy in the HARQ-ACK codebook by having a TDRA entry represented in multiple F-TDRA entries at the cost of a larger codebook size. In an additional example implementation, the gNB may configure the F-TDRA table by a sub-set of the entries in the TDRA table (without being concerned about overlapping entries), for example, "every $N^{th}$ entry."

In some implementations, for example, each TDRA entry may be mapped (e.g., explicitly) into a bit-index in the Type-1 HARQ-ACK codebook. Therefore, in such an implementation, downlink allocations which are not time-consecutive, e.g., resources A and D as illustrated in 300 of FIG. 3 may be mapped into the same codebook bit-index, while resources B and C may be mapped into another codebook bit-index.

In some implementations, a logical "AND" operation may be used. For example, the gNB may manage how the UE provides feedback for multiple combined indices. In an example implementation, if multiple entries are indicated by the same F-TDRA entry, logical AND operation may be performed on the TDRA entries with associated DCIs (e.g., PDSCHs with valid downlink assignments). For example, as resources A, B, and E are mapped to the same F-TDRA entry as shown in 350 of FIG. 3, if resources A and B are simultaneously used, then both resources A and B needs to be ACK for the bundling algorithm to provide an ACK to the gNB.

In some implementations, for example, in addition to the logical AND operation described above, a pruning operation of overlapping PDSCH allocations in the bit-bundling may be used. For example, if a PDSCH is correctly decoded at the UE and an ACK is sent to the gNB, any overlapping PDSCH allocation with the correctly decoded PDSCH may be removed from the bit-bundling process.

In some implementations, for example, a logical "OR" may be used. In an example implementation, the logical OR operation may be performed where at least one of the simultaneously used TDRA entries has to be ACK/NACK for the bundling algorithm at the UE to report ACK/NACK to the gNB.

In some implementations, the logical AND or OR operations may be configured separately for each F-TDRA entry.

Figure 4:
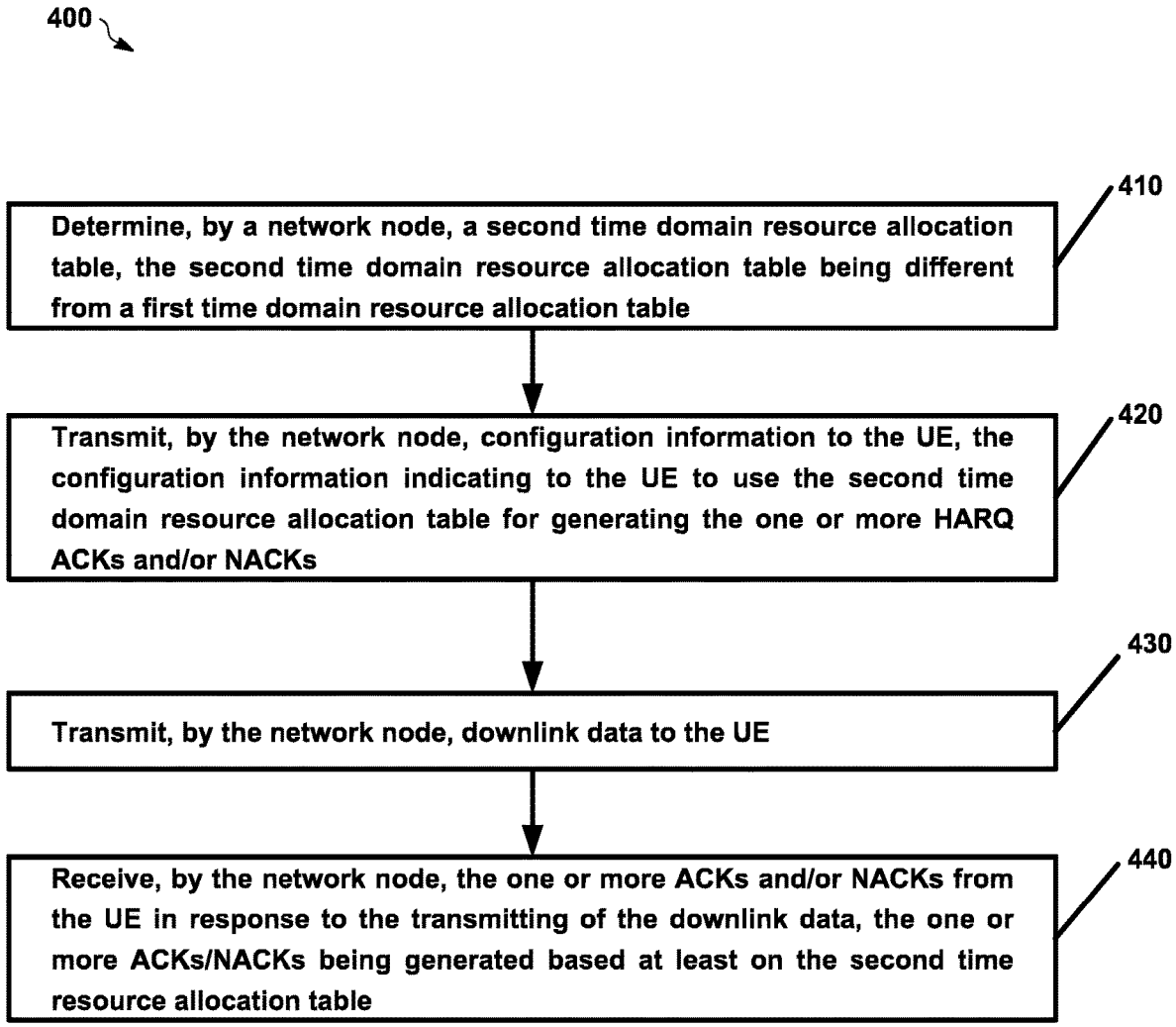
FIG. 4 is a flow chart illustrating construction of an example HARQ-ACK codebook for managing the trade-off between codebook size and feedback granularity, according to an example implementation.

FIG. 4 is a flow chart 400 illustrating construction of an example HARQ-ACK codebook for managing the trade-off between codebook size and feedback granularity, according to an example implementation.

At block 410, a network node (e.g., gNB 202) may determine a second time domain resource allocation table. In some implementations, for example, the second time domain resource allocation table may be an F-TDRA table, e.g., 340 of FIG. 3.

In some implementations, the second time domain resource allocation table (e.g., F-TDRA Table, 340 of FIG. 3) may be different from a first time domain resource allocation table (e.g., 310 of FIG. 3). The first time domain resource allocation table may be used for indicating time domain resources allocated to a physical downlink shared channel for communications with a UE (e.g., UE 204) and the second time domain resource allocation table may be used for generating one or more hybrid automatic repeat request (HARQ) acknowledgements (ACKs) and/or negative ACKs (NACKs) by the UE.

At block 420, gNB 202 may transmit configuration information to the UE. In some implementations, for example, the configuration information may indicate to the UE to use the second time domain resource allocation table for generating the one or more HARQ ACKs and/or NACKs.

At block 430, gNB 202 may transmit downlink data to the UE. In some implementations, for example, gNB 202 may transmit the downlink data to the UE over a PDSCH.

At block 440, gNB 202 may receive the one or more ACKs and/or NACKs from the UE in response to the transmitting of the downlink data. In some implementations, for example, the one or more ACKs/NACKs may be generated based at least on the second time resource allocation table.

Thus, a HARQ-ACK codebook for managing the trade-off between codebook size and feedback granularity may be constructed and used efficiently.

Additional example implementations are described herein.

Example 1. A method of communications, comprising: determining, by a network node, a second time domain resource allocation table, the second time domain resource allocation table being different from a first time domain resource allocation table, the first time domain resource allocation table used for indicating time domain resources allocated to a physical downlink shared channel for communications with a user equipment (UE) and the second time domain resource allocation table used for generating one or more hybrid automatic repeat request (HARQ) acknowledgements (ACKs) and/or negative ACKs (NACKs) by the UE; transmitting, by the network node, configuration information to the UE, the configuration information indicating to the UE to use the second time domain resource allocation table for generating the one or more HARQ ACKs and/or NACKs; transmitting, by the network node, downlink data to the UE; and receiving, by the network node, the one or more ACKs and/or NACKs from the UE in response to the transmitting of the downlink data, the one or more ACKs/NACKs being generated based at least on the second time resource allocation table.

Example 2. The method of Example 1, wherein the second time domain resource allocation table is determined from at least the first time resource allocation table.

Example 3. The method of any of Examples 1-2, further comprising: transmitting, by the network node, the first and second time domain resource allocation tables to the UE.

Example 4. The method of any of Examples 1-3, further comprising: transmitting, by the network node, HARQ ACK/NACK bit-mapping information to the UE.

Example 5. The method of any of Examples 1-4, wherein the bit-mapping information maps entries in the first time domain resource allocation table to entries in the second time domain resource allocation table.

Example 6. The method of any of Examples 1-5, further comprising: transmitting, by the network node, HARQ ACK/NACK bit-bundling information to the UE.

Example 7. The method of any of Examples 1-6, wherein the bit-bundling information indicates to the UE to use a bit-bundling operation when at least two entries in the first time domain resource allocation table are mapped to one entry in the second time domain resource allocation table.

Example 8. The method of any of Examples 1-7, wherein the bit-bundling information indicates to the UE to use the bit-bundling operation based on a logical AND operation for ACK/NACKs associated with the at least two entries in the first time domain resource allocation table which have associated downlink control information (DCI) or expected semi persistent scheduling (SPS) physical downlink shared channel (PDSCH) allocations.

Example 9. The method of any of Examples 1-8, wherein the network node is a gNB.

Figure 5:
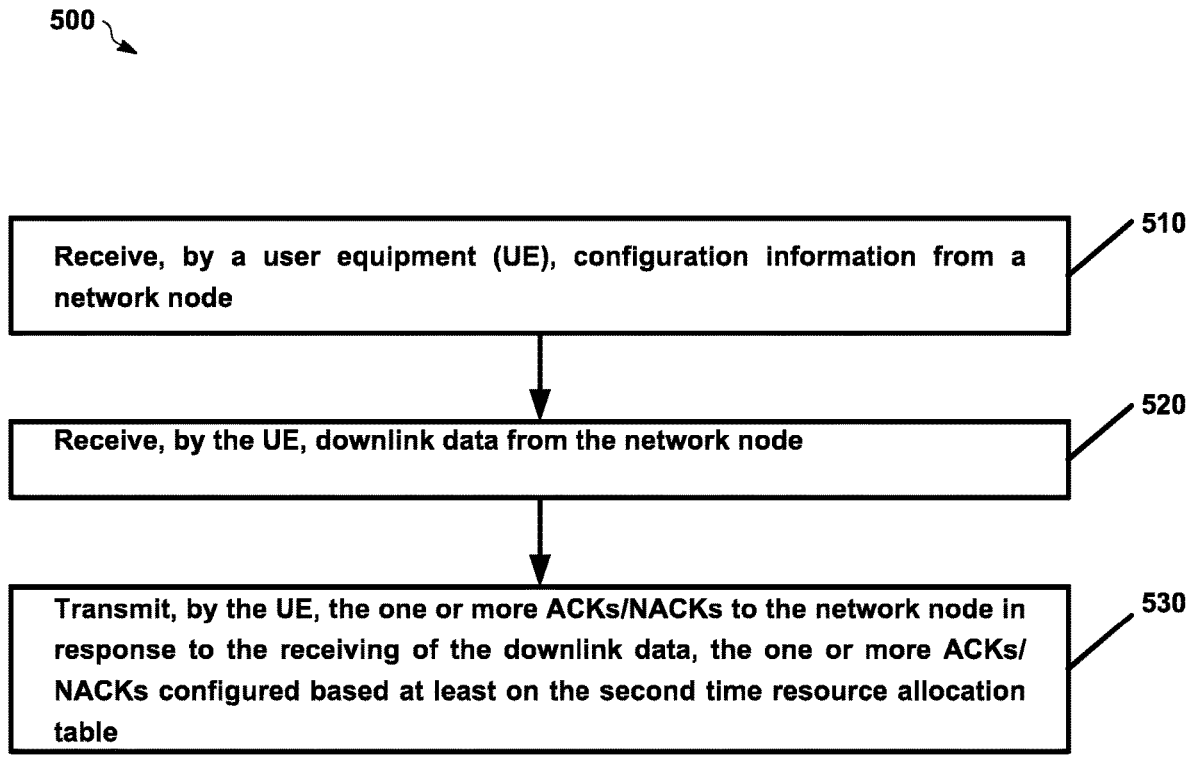
FIG. 5 is a flow chart illustrating construction of an example HARQ-ACK codebook for managing the trade-off between codebook size and feedback granularity, according to an additional example implementation.

FIG. 5 is a flow chart 500 illustrating construction of an example HARQ-ACK codebook for managing the trade-off between codebook size and feedback granularity, according to an additional example implementation.

At block 510, a UE (e.g., UE 204) may receive configuration information from a network node. In some implementations, for example, the configuration information may indicate to the UE to use a second time domain resource allocation table (e.g., 340 of FIG. 3) for generating one or more hybrid automatic repeat request (HARQ) acknowledgements (ACKs) and/or negative ACKs (NACKs).

At block 520, UE 204 may receive downlink data from the network node.

At block 530, UE 204 may transmit the one or more ACKs/NACKs to the network node in response to the receiving of the downlink data, the one or more ACKs/NACKs configured based at least on the second time resource allocation table. In some implementations, for example, UE 204 may transmit ACK/NACKs based on the F-TDRA table.

Thus, a HARQ-ACK codebook for managing the trade-off between codebook size and feedback granularity may be constructed and used efficiently.

Additional example implementations are described herein.

Example 10. A method of communications, comprising: receiving, by a user equipment (UE), configuration information from a network node, the configuration information indicating to the UE to use a second time domain resource allocation table for generating one or more hybrid automatic repeat request (HARQ) acknowledgements (ACKs) and/or negative ACKs (NACKs); receiving, by the UE, downlink data from the network node; and transmitting, by the UE, the one or more ACKs/NACKs to the network node in response to the receiving of the downlink data, the one or more ACKs/NACKs configured based at least on the second time resource allocation table.

Example 11. The method of Example 10, further receiving: a first time domain resource allocation table, wherein first time domain resource allocation table is different from the second time domain resource allocation table, the first time domain resource allocation table used for indicating time domain resources allocated to a physical downlink shared channel for transmitting the downlink data to the UE and the second time domain resource allocation table used for generating the one or more HARQ ACKs/NACKs by the UE.

Example 12. The method of any of Examples 10-11, further comprising: receiving, by the UE, HARQ ACK/NACK bit-mapping information from the network node.

Example 13. The method of any of Examples 10-12, wherein the bit-mapping information maps entries in the first time domain resource allocation table to entries in the second time domain resource allocation table.

Example 14. The method of any of Examples 10-13, wherein entries in the first time domain resource allocation table are mapped into non-overlapping entries in the second time domain resource allocation table, wherein the mapping is determined based at least on a starting or ending allocation symbol.

Example 15. The method of any of Examples 10-13, wherein entries in the first time domain resource allocation table are mapped into overlapping entries in the second time domain resource allocation table, wherein the mapping is determined based at least on a starting or ending allocation symbol.

Example 16. The method of any of Examples 10-15, further comprising: receiving, by the UE, HARQ ACK/NACK bit-bundling information from the network node.

Example 17. The method of any of Examples 10-16, wherein the one or more ACK/NACKs are transmitted to the network node by performing a bit-bundling operation based at least on the bit-bundling information when at least two entries in the first time domain resource allocation table are mapped to one entry in the second time domain resource allocation table.

Example 18. The method of any of Examples 10-17, wherein the bit-bundling operation is based on a logical AND operation for ACK/NACKs associated with the at least two entries in the first time domain resource allocation table which have associated downlink control information (DCI).

Example 19. The method of any of Examples 10-18, wherein the bit-bundling operation is based on a logical OR operation for ACK/NACKs associated with all entries of a plurality of entries in the first time resource allocation table mapped to one entry in the second resource allocation table.

Example 20. The method of any of Examples 11-19, wherein the network node is a gNB.

Figure 6:
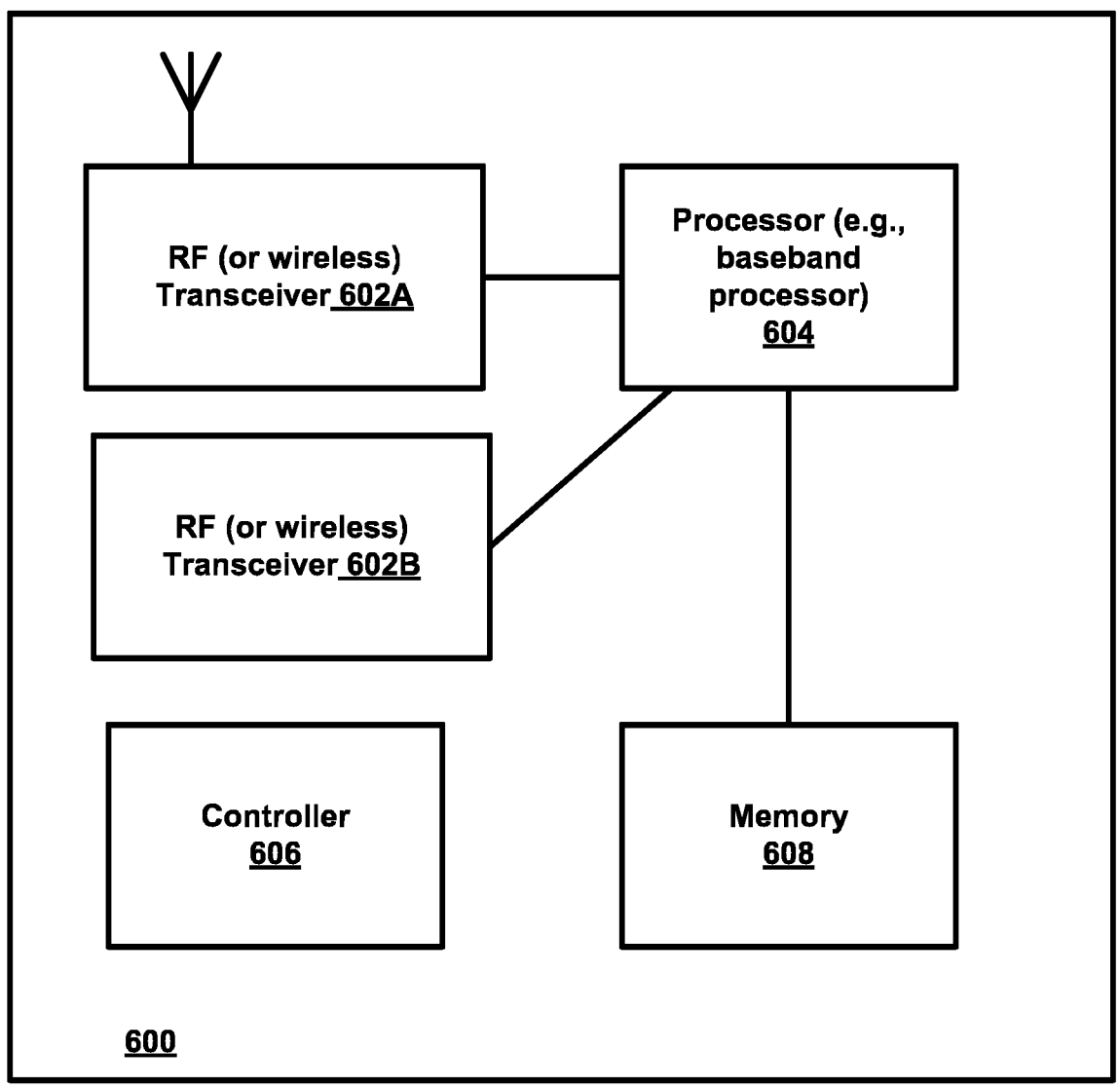
FIG. 6 is a block diagram of a node or wireless station (e.g., base station/access point or mobile station/user device/UE), according to an example implementation.

FIG. 6 is a block diagram of a wireless station (e.g., user equipment (UE)/user device or AP/gNB/MgNB/SgNB) 600 according to an example implementation. The wireless station 600 may include, for example, one or more RF (radio frequency) or wireless transceivers 602A, 602B, where each wireless transceiver includes a transmitter to transmit signals and a receiver to receive signals. The wireless station also includes a processor or control unit/entity (controller) 604/608 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software. Moreover, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus comprising:
at least one processor; and
at least one memory including computer program code;
the at least one memory and the computer program code configured to, with the at least one processor, cause the apparatus at least to:
determine, by a network node, a second time domain resource allocation table, the second time domain resource allocation table being different from a first time domain resource allocation table, the first time domain resource allocation table used for indicating time domain resources allocated to a physical downlink shared channel for communications with a user equipment (UE) and the second time domain resource allocation table used for generating one or more hybrid automatic repeat request (HARQ) acknowledgements (ACKs) and negative ACKs (NACKs) by the UE, wherein entries in the first time domain resource allocation table are mapped into overlapping entries in the second time domain resource allocation table, wherein the mapping is determined based at least on a starting or ending allocation symbol;
transmit, by the network node, configuration information to the UE, the configuration information indicating to the UE to use the second time domain resource allocation table for generating the one or more HARQ ACKs and NACKS;
transmit, by the network node, HARQ ACK/NACK bit-bundling information to the UE, the bit-bundling information comprising: a first indication to the UE to use a bit-bundling operation when at least two entries in the first time domain resource allocation table are mapped to one entry in the second time domain resource allocation table, a second indication to the UE to use the bit-bundling operation based on a logical AND operation for ACK and NACKs associated with the at least two entries in the first time domain resource allocation table which have associated downlink control information (DCI) or expected semi persistent scheduling (SPS) physical downlink shared channel (PDSCH) allocations, and a third indication to the UE to use the bit-bundling operation is based on a logical OR operation for ACK and NACKs associated with all entries of a plurality of entries in the first time domain resource allocation table mapped to one entry in the second time domain resource allocation table;
transmit, by the network node, downlink data to the UE; and
in response to transmitting the downlink data, receive, by the network node, the one or more ACKs and NACKs from the UE based on a bit-bundling operation being performed that is based at least on the transmitted bit-bundling information when at least two entries in the first time domain resource allocation table are mapped to one entry in the second time domain resource allocation table.

2. The apparatus of claim 1, wherein the second time domain resource allocation table is determined from at least the first time domain resource allocation table.

3. The apparatus of claim 2, being configured to further cause the apparatus to: transmit, by the network node, the first and second time domain resource allocation tables to the UE.

4. The apparatus of claim 3, being configured to further cause the apparatus to: transmit, by the network node, HARQ ACK and NACK bit-mapping information to the UE.

5. The apparatus of claim 4, wherein the bit-mapping information maps entries in the first time domain resource allocation table to entries in the second time domain resource allocation table.

6. The apparatus of claim 1, wherein the network node is a gNB.

7. An apparatus comprising:
at least one processor; and
at least one memory including computer program code;
the at least one memory and the computer program code configured to, with the at least one processor, cause the apparatus at least to:
receive a first time domain resource allocation table, wherein first time domain resource allocation table is different from a second time domain resource allocation table, the first time domain resource allocation table used for indicating time domain resources allocated to a physical downlink shared channel for transmitting the downlink data to the apparatus and the second time domain resource allocation table used for generating the one or more hybrid automatic repeat request (HARQ) acknowledgements (ACKs) and negative ACKs (NACKs);

receive configuration information from a network node, the configuration information indicating to the apparatus to use the second time domain resource allocation table for generating one or more HARQ ACKs and NACKs, the second time domain resource allocation table being different from the first time domain resource allocation table, wherein entries in the first time domain resource allocation table are mapped into non-overlapping entries in the second time domain resource allocation table, wherein the mapping is determined based at least on a starting or ending allocation symbol;

receive HARQ ACK and NACK bit-bundling information from the network node, the bit-bundling information comprising: a first indication to the apparatus to use a bit-bundling operation when at least two entries in the first time domain resource allocation table are mapped to one entry in the second time domain resource allocation table, a second indication to the apparatus to use the bit-bundling operation based on a logical AND operation for ACK and NACKs associated with the at least two entries in the first time domain resource allocation table which have associated downlink control information (DCI) or expected semi persistent scheduling (SPS) physical downlink shared channel (PDSCH) allocations, and a third indication to the apparatus to use the bit-bundling operation is based on a logical OR operation for ACK and NACKs associated with all entries of a plurality of entries in the first time resource allocation table mapped to one entry in the second time domain resource allocation table;

receive, by the apparatus, downlink data from the network node;

perform a bit-bundling operation based at least on the bit-bundling information when at least two entries in the first time domain resource allocation table are mapped to one entry in the second time domain resource allocation table; and based on the performing, transmit the one or more ACKs/NACKs to the network node in response to the receiving of the downlink data, the one or more ACKS and NACKS configured based at least on the second time domain resource allocation table.

8. The apparatus of claim 7, being configured to further cause the apparatus to: receive, by the apparatus, HARQ ACK/NACK bit-mapping information from the network node.

9. The apparatus of claim 8, wherein the bit-mapping information maps entries in the first time domain resource allocation table to entries in the second time domain resource allocation table.

10. The apparatus of claim 7, further comprising: receiving, by the apparatus, HARQ ACK/NACK bit-bundling information from the network node.

11. A method comprising:

receiving, by a user equipment (UE), a first time domain resource allocation table, wherein first time domain resource allocation table is different from a second time domain resource allocation table, the first time domain resource allocation table used for indicating time domain resources allocated to a physical downlink shared channel for transmitting the downlink data to the apparatus and the second time domain resource allocation table used for generating the one or more hybrid automatic repeat request (HARQ) acknowledgements (ACKs) and negative ACKs (NACKs);

receiving, by the UE, configuration information from a network node, the configuration information indicating to the UE to use the second time domain resource allocation table for generating one or more HARQ ACKs and NACKs, the second time domain resource allocation table being different from the first time domain resource allocation table, wherein entries in the first time domain resource allocation table are mapped into non-overlapping entries in the second time domain resource allocation table, wherein the mapping is determined based at least on a starting or ending allocation symbol;

receiving, by the UE, HARQ ACK and NACK bit-bundling information from the network node, the bit-bundling information comprising: a first indication to the apparatus to use a bit-bundling operation when at least two entries in the first time domain resource allocation table are mapped to one entry in the second time domain resource allocation table, a second indication to the apparatus to use the bit-bundling operation based on a logical AND operation for ACK and NACKs associated with the at least two entries in the first time domain resource allocation table which have associated downlink control information (DCI) or expected semi persistent scheduling (SPS) physical downlink shared channel (PDSCH) allocations, and a third indication to the apparatus to use the bit-bundling operation is based on a logical OR operation for ACK and NACKs associated with all entries of a plurality of entries in the first time domain resource allocation table mapped to one entry in the second time domain resource allocation table;

receiving, by the UE, downlink data from the network node;

performing, by the UE, a bit-bundling operation based at least on the bit-bundling information when at least two entries in the first time domain resource allocation table are mapped to one entry in the second time domain resource allocation table; and based on the performing, transmitting, by the UE, the one or more ACKs and NACKs to the network node in response to the receiving of the downlink data, the one or more ACKS and NACKS configured based at least on the second time domain resource allocation table.

* * * * *